Figure 1:
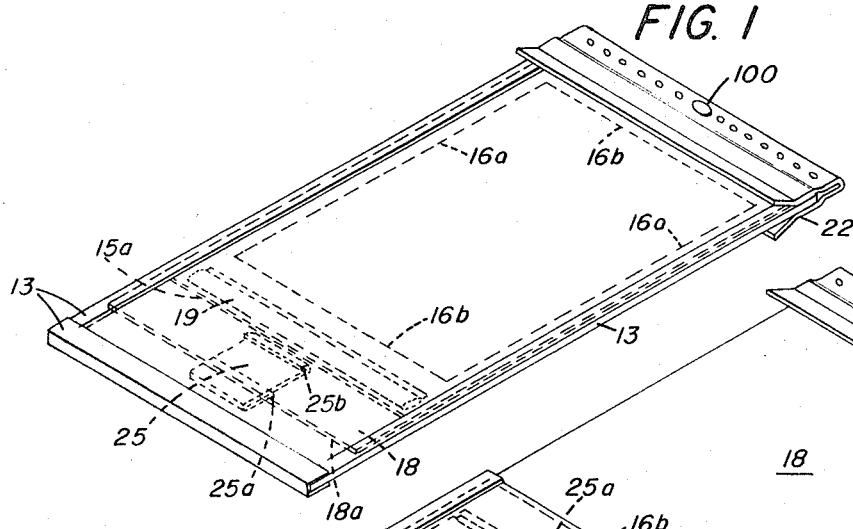
Figure 2:
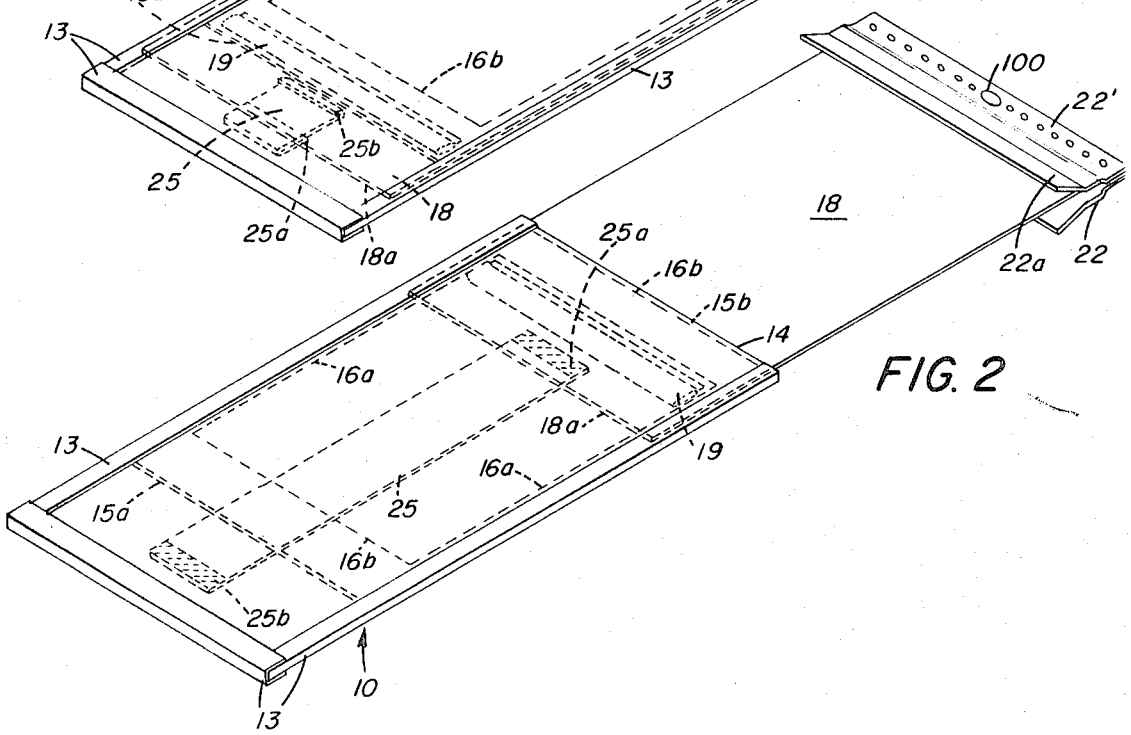
Figure 3:
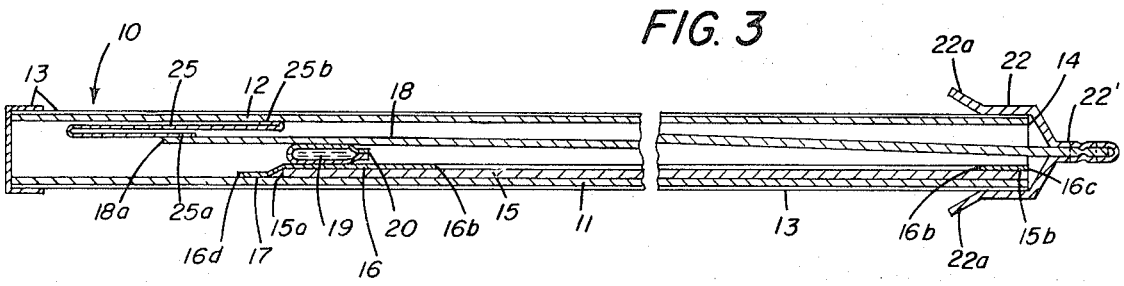
Figure 4:
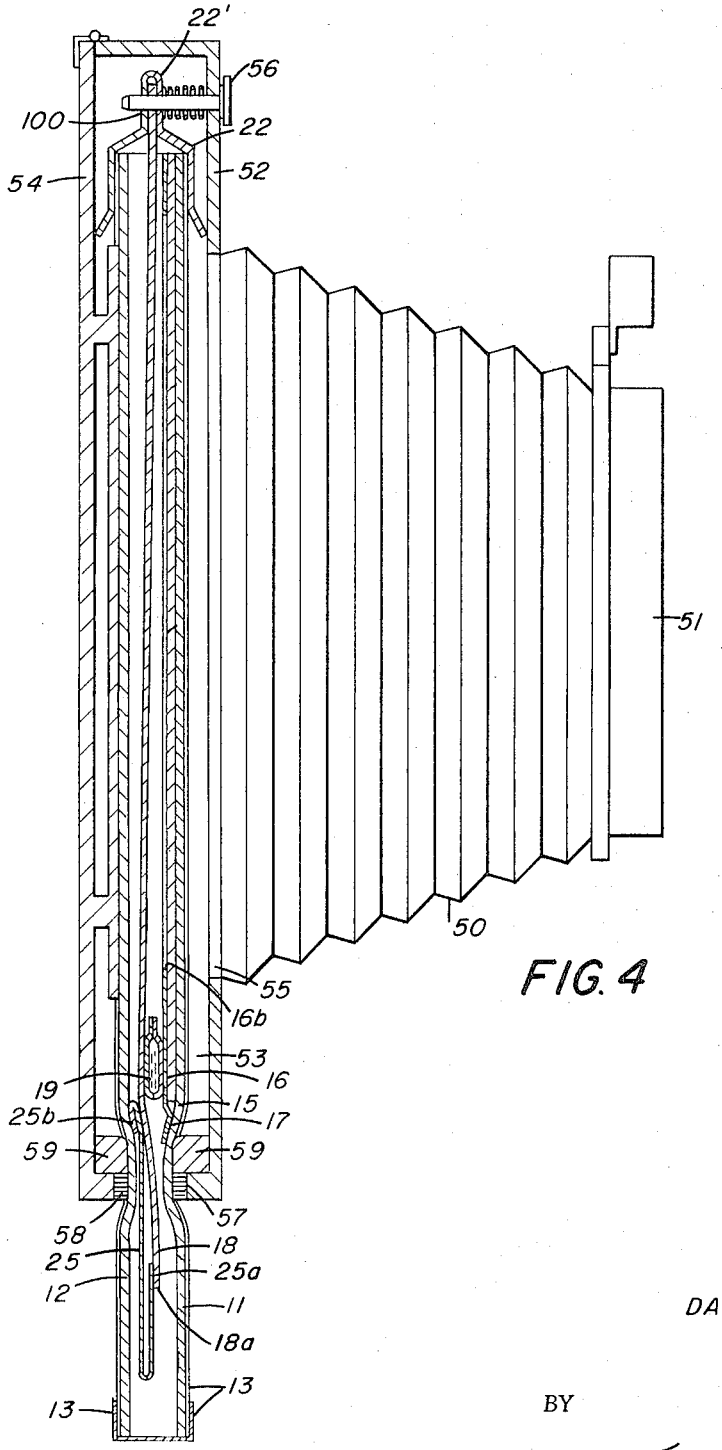

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 5

T903,006
PHOTOGRAPHIC FILM UNIT
David A. Frost, 1669 Lake Ave., Rochester, N.Y. 14650
Filed July 6, 1971, Ser. No. 159,963
Int. Cl. G03b *17/50*
U.S. Cl. 95—13
2 Sheets Drawing. 18 Pages Specification

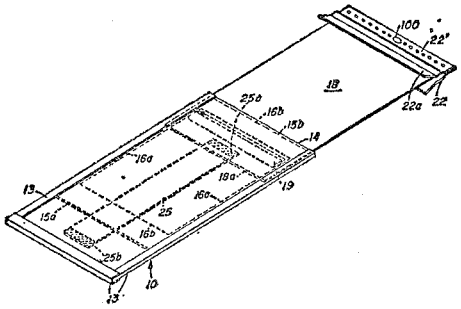

In a photographic film unit of the in-camera processing type comprising a sheet of photosensitive film and a sheet of image-receiving material adapted to be processed by spreading a processing solution between the two contained within an opaque envelope open at one end to allow the envelope and said sheet of image-receiving material to be slid off the film for exposure of the film and returned to covering relation with the film for processing, the improvement which comprises incorporating within the film unit itself a flexible limit strap for positively limiting the amount the envelope can be withdrawn from the film for exposure of the film. This limit strap has one of its ends attached to the back side of the film and its other end attached to the inside of one wall of the envelope. As the envelope is slid off the film this limit strap is unfolded and stops withdrawal of the envelope from the film when it becomes fully extended.

Oct. 3, 1972 D. A. FROST T903,006

PHOTOGRAPHIC FILM UNIT

Filed July 6, 1971 2 Sheets-Sheet 1

DAVID A. FROST
INVENTOR.

BY

ATTORNEY

PHOTOGRAPHIC FILM UNIT

Filed July 6, 1971 2 Sheets-Sheet 2

DAVID A. FROST
INVENTOR.

BY

Kurt Thasamon
ATTORNEY